(12) United States Patent
Kinoe et al.

(10) Patent No.: US 8,405,994 B2
(45) Date of Patent: Mar. 26, 2013

(54) HEAT DISSIPATING MEMBER, ELECTROOPTIC DEVICE AND ELECTRONIC APPARATUS

(75) Inventors: Yusuke Kinoe, Suwa (JP); Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 13/080,206

(22) Filed: Apr. 5, 2011

(65) Prior Publication Data

US 2011/0249405 A1 Oct. 13, 2011

(30) Foreign Application Priority Data

Apr. 7, 2010 (JP) ................. 2010-088382

(51) Int. Cl.
*H05K 7/20* (2006.01)
*G09F 9/30* (2006.01)

(52) U.S. Cl. .............. 361/704; 361/679.21; 361/679.54; 361/707; 361/709; 361/710; 361/715; 165/80.3; 165/104.33; 165/185; 349/58; 349/62; 349/110; 349/111; 362/231; 362/294; 362/632; 353/52; 353/122; 372/36

(58) Field of Classification Search ............ 361/679.21, 361/679.46, 679.54, 690, 679, 697, 704–715, 361/717–728; 165/80.2–80.5, 104.33, 104.34, 165/121–126, 185; 257/706–727; 174/15.1, 174/16.3, 252; 353/52, 54, 122; 349/54, 349/58, 56, 62, 151–158, 189, 190; 362/632–634, 362/231, 294; 372/33–36, 10, 92, 102; 385/14, 385/15, 92, 94, 131, 132
See application file for complete search history.

(56) References Cited

U.S. PATENT DOCUMENTS

| | | | | |
|---|---|---|---|---|
| 5,742,366 A | * | 4/1998 | Imoto | 349/62 |
| 6,359,721 B1 | * | 3/2002 | Fujimori | 359/246 |
| 6,414,781 B1 | * | 7/2002 | Saitoh | 359/245 |
| 6,498,672 B2 | * | 12/2002 | Saitoh | 359/245 |
| 6,731,367 B1 | * | 5/2004 | Saitoh | 349/158 |
| 7,068,343 B2 | * | 6/2006 | Saitoh | 349/158 |
| 7,139,062 B2 | * | 11/2006 | Saitoh | 349/161 |
| 7,228,020 B2 | * | 6/2007 | Weigert | 385/14 |
| 7,702,191 B1 | * | 4/2010 | Geron et al. | 385/14 |
| 7,967,454 B2 | * | 6/2011 | Hirabayashi et al. | 353/122 |
| 8,184,432 B2 | * | 5/2012 | Miyashita | 361/679.21 |
| 2009/0146158 A1 | * | 6/2009 | Park | 257/89 |
| 2010/0271782 A1 | * | 10/2010 | Miyashita | 361/707 |

FOREIGN PATENT DOCUMENTS

| | | | |
|---|---|---|---|
| JP | 2006258883 A | * | 9/2006 |
| JP | 2007-298615 A | | 11/2007 |
| JP | 2008-015386 A | | 1/2008 |
| JP | 2010-014809 A | | 1/2010 |

* cited by examiner

*Primary Examiner* — Michail V Datskovskiy
(74) *Attorney, Agent, or Firm* — ALG Intellectual Property, LLC

(57) ABSTRACT

A heat dissipating member is formed so as to be opposed to a reflection type liquid crystal panel. The heat dissipating member includes a heat receiving portion that is opposed to a reflection type light modulation element and has a heat receiving surface for receiving heat from the element, a heat dissipating fin that dissipates heat received on the heat receiving portion to the outside. The heat receiving portion has heat receiving convexes which project to the side at which the element is arranged from the heat receiving surface, and the convexes are formed such that ratios of areas of tip surfaces of the heat receiving convexes with respect to a unit area are larger on a center portion of a heat reception acceleration region rather than on an end of the heat reception acceleration region.

8 Claims, 8 Drawing Sheets

HEAT DISSIPATING MEMBER, ELECTROOPTIC DEVICE AND ELECTRONIC APPARATUS

Japanese Patent Application No. 2010-088382, filed Apr. 7, 2010 is incorporated by reference in its entirety herein.

BACKGROUND

1. Technical Field

The present invention relates to a heat dissipating member, an electrooptic device and an electronic apparatus.

2. Related Art

In recent years, luminance of an projection image is strongly required to be higher for a projector using a reflection type liquid crystal element (reflection type liquid crystal panel). In order to achieve such requirement, it can be considered that luminance of a light source is made higher. However, if the luminance of the light source is made higher, the temperature of a reflection type liquid crystal panel is increased. In particular, a light source used for such application has only a uniform intensity distribution in many cases. Therefore, the temperature of the reflection type liquid crystal panel at a center portion (panel center portion) is higher than that at a frame portion (panel frame portion) from which heat is easily dissipated. If such temperature distribution is generated, liquid crystal on the panel center portion is progressively deteriorated rather than that on the panel frame portion. This may cause color unevenness. Therefore, study has been made for eliminate the above failure (for example, see JP-A-2010-14809).

In JP-A-2010-14809, a heat conductive filler arranged between a reflection type liquid crystal panel and a heat dissipating portion is filled into a portion corresponding to a display region on a back surface of the reflection type liquid crystal panel so as to be firmly adhered thereto. With this, the heat conductive filler absorbs heat on the entire of the display region. Further, the surface of the heat dissipating portion, which is opposed to the reflection type liquid crystal panel, is curved into a convex form such that the surface at the center portion is the closest to the reflection type liquid crystal panel. With the configuration, a space (center space) between the reflection type liquid crystal panel and the heat dissipating portion at the center portion of the display region is made smaller than a space (frame space) between the reflection type liquid crystal panel and the heat dissipating portion at the frame portion of the region. Therefore, heat receiving efficiency by the heat dissipating portion at the center portion of the display region is made higher than that at the frame portion so that the temperature distribution is made uniform.

However, in JP-A-2010-14809, since the heat conductive filler is firmly adhered to the entire of the display region, there is little difference in the heat receiving efficiency on the display region. Further, since the reflection type liquid crystal panel is extremely small in size, the difference between the center space and the frame space is only slightly generated even if the curved surface is provided on the heat dissipating portion. Therefore, there arises little difference in the heat receiving efficiency by the heat conductive filler and the heat dissipating portion on the display region. This causes a problem that the temperature distribution on the region cannot be made uniform sufficiently.

SUMMARY

An advantage of some aspects of the invention is to provide a heat dissipating member, an electrooptic device and an electronic apparatus which can make temperature distribution on a display region uniform with a simple configuration.

A heat dissipating member according to an aspect of the invention is arranged so as to be opposed to a reflection type light modulation element. The heat dissipating member includes a heat receiving portion that is opposed to the reflection type light modulation element and has a heat receiving surface for receiving heat from the reflection type light modulation element, and a heat dissipating portion that dissipates heat received on the heat receiving portion to the outside at an opposite surface side to the heat receiving surface. In the heat dissipating member, the heat receiving portion has a plurality of heat receiving convexes which project to the side at which the reflection type modulation element is arranged from the heat receiving surface, and the heat receiving portion is formed such that ratios of areas of tip surfaces of the plurality of heat receiving convexes with respect to a unit area of the heat receiving surface are larger on a region opposed to a center portion of the heat receiving portion rather than on a region opposed to an end of the heat receiving portion.

With the aspect of the invention, the heat receiving portion has the heat receiving surface which is opposed to the reflection type light modulation element, and the plurality of heat receiving convexes which project to the side at which the reflection type modulation element is arranged from the heat receiving surface. Further, the plurality of heat receiving convexes are formed such that ratios of areas of tip surfaces (tip surface area ratios) with respect to a unit area of the heat receiving surface are larger on a region opposed to a center portion of the heat receiving portion rather than on a region opposed to an end of the heat receiving portion. That is to say, the tip surface area ratio on the center portion of which temperature becomes higher is made larger on the heat receiving convexes where a space between the heat dissipating member and the reflection type light modulation element is small. The tip surface area ratio is made larger because a heat receiving efficiency becomes larger as an area of the tip surface is larger. Therefore, heat receiving efficiency on the center portion of the heat receiving portion can be made larger than that on the end of the heat receiving portion in comparison with a configuration in which the heat receiving convexes are made higher toward the center portion of the heat receiving portion from the end of the heat receiving portion as in the existing configuration. Then, heat received on the heat conductive member can be dissipated through the heat dissipating portion. Accordingly, temperature distribution in the display region is made uniform, thereby suppressing deterioration of the reflection type light modulation element due to high temperature. This makes it possible to suppress failures such as color unevenness from being caused.

In the heat dissipating member according to the aspect of the invention, it is preferable that the plurality of heat receiving convexes be formed such that arrangement pitches are smaller on the center portion of the heat receiving portion rather than on the end of the heat receiving portion.

With the aspect of the invention, the tip surface area ratios can be set to be larger on the center portion of the heat receiving portion rather than on the end of the heat receiving portion with a simple configuration in which the arrangement pitches of the heat receiving convexes are changed only.

In the heat dissipating member according to the aspect of the invention, it is preferable that the plurality of heat receiving convexes be formed such that the areas of the tip surfaces are larger on the center portion of the heat receiving portion rather than on the end of the heat receiving portion.

With the aspect of the invention, the heat receiving convex having a tip surface of a larger surface area is arranged on the center portion of the heat receiving portion and the heat receiving convex having a tip surface of a smaller surface area is arranged on the end of the heat receiving portion. With such arrangement, the tip surface area ratios can be also set to be larger on the center portion of the heat receiving portion rather than on the end of the heat receiving portion.

In the heat dissipating member according to the aspect of the invention, it is preferable that the plurality of convexes be formed in ring shapes when seen from a normal line direction of the heat receiving surface of the heat receiving portion.

With the aspect of the invention, since the heat receiving convexes are formed in ring shapes, the shape of a mold used for manufacturing the heat dissipating member can be made simple.

In the heat dissipating member according to the aspect of the invention, it is preferable that the plurality of convexes be formed in columnar shapes and are arranged in a discrete manner when seen from the normal line direction of the heat receiving surface of the heat receiving portion.

With the aspect of the invention, the following effects can be obtained in addition to the above effects. That is, even when a filler such as an adhesive is used when the heat receiving portion is arranged on the back surface of surfaces of a reflection type light modulation element on which a display region is formed so as to be opposed to the reflection type light modulation element, the filler can be evenly spread among the heat receiving convexes so as to be arranged easily.

An electrooptic device according to another aspect of the invention includes a reflection type light modulation element on which a pair of substrates are arranged so as to be opposed to each other, and the above heat dissipating member.

With the aspect of the invention, the electrooptic device includes the heat dissipating member according to the above aspect of the invention. Therefore, temperature distribution in the display region is made uniform, thereby suppressing deterioration of liquid crystal due to high temperature. This makes it possible to suppress failures such as color unevenness from being caused.

In the electrooptic device according to the aspect of the invention, it is preferable that a filler having a good heat conductivity be arranged between the reflection type light modulation element and the heat dissipating member.

With the aspect of the invention, heat conductivity can be enhanced in comparison with a case where a space between the reflection type light modulation element and the heat dissipating member is kept not to be filled with a filler. Therefore, a heat receiving efficiency on the heat receiving portion can be enhanced.

An electronic apparatus according to another aspect of the invention includes the above electrooptic device.

With the aspect of the invention, the electronic apparatus includes the electrooptic device according to the above aspect of the invention. Therefore, a projection image of which color unevenness is suppressed can be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention is described with reference to drawings.

First Embodiment

Configuration of Projector

Figure 1:
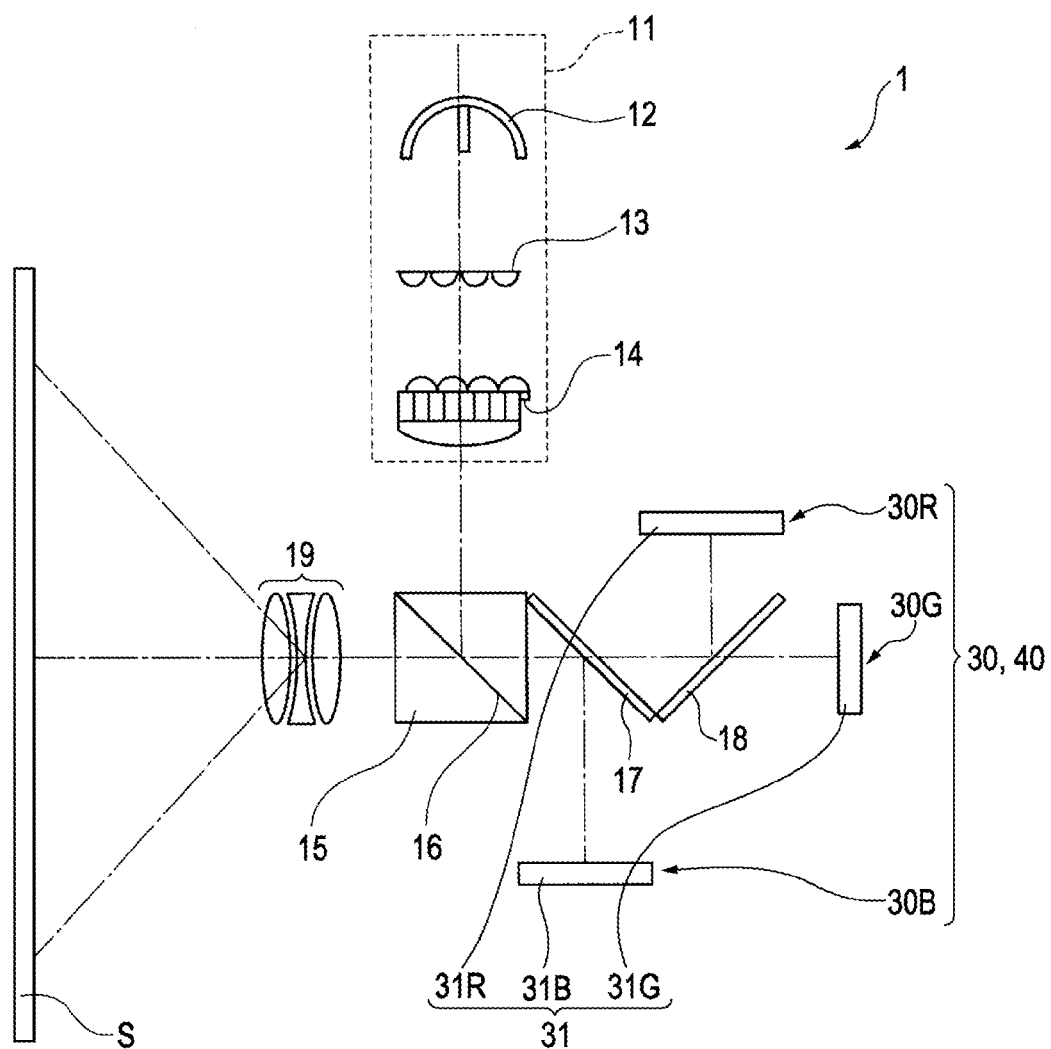
FIG. 1 is a view illustrating a configuration of a projector according to a first embodiment, a second embodiment, and modifications of the invention.

FIG. 1 is a view schematically illustrating an outline configuration of a projector 1.

The projector 1 forms a color image (image light) by modifying light beam output from a light source in accordance with image information and enlarges and projects the color image onto a screen S.

The projector 1 includes a polarization illumination device 11, a polarization beam splitter 15, a dichroic mirror 17, and a dichroic mirror 18. The polarization illumination device 11 includes a light source 12, an integrator lens 13 and a polarization modulation element 14. The polarization beam splitter 15 reflects S-polarization beam output from the polarization illumination device 11 by an S-polarization beam reflection surface 16. The dichroic mirror 17 separates the component of blue light (B) from the light beam reflected from the S-polarization beam reflection surface 16 of the polarization beam splitter 15. The dichroic mirror 18 reflects and separates the component of red light (R) from the light beam from which the component of blue light has been separated. Further, the projector 1 includes three reflection type electrooptic devices 30 serving as electrooptic devices to which lights of each color are incident. The three reflection type electrooptic devices 30 include a reflection type electrooptic device 30R, a reflection type electrooptic device 30G, and a reflection type electrooptic device 30B.

The three reflection type electrooptic devices 30 include reflection type liquid crystal panels 31 serving as reflection type liquid crystal elements. Each of the reflection type liquid crystal panels 31 is formed by a translucent substrate such as quartz, glass, or the like or so-called LCOS (Liquid Crystal On Silicon) on which liquid crystal is formed on a silicon substrate. Note that the reflection type liquid crystal panels 31 include reflection type liquid crystal panels 31R, 31G, 31B for lights of each color like the reflection type electrooptic devices 30. Each reflection type electrooptic device 30 is arranged in a state where each reflection type liquid crystal panel 31 is substantially orthogonal to an optical axis of light beam transmitted through the dichroic mirrors 17, 18.

In each reflection type liquid crystal panel 31, an orientation state of the liquid crystal is controlled in accordance with a driving signal transmitted from a controller (not shown). Then, each reflection type liquid crystal panel 31 modulates the polarizing direction of the incident light beam and reflects the light beam toward the dichroic mirrors 17, 18.

It is to be noted that each reflection type electrooptic device 30 includes a heat dissipating member 35 (not shown in FIG. 1), a heat conductive member 38 (not shown in FIG. 1) and the like in addition to the reflection type liquid crystal panel 31. A detail configuration of each reflection type electrooptic device 30 will be described later.

The projector 1 synthesizes the lights modulated by three reflection type electrooptic devices 30R, 30G, 30B on the dichroic mirrors 17, 18 and the polarization beam splitter 15, and then, projects the synthesized light onto the screen S through a projection lens 19.

Detail Configuration of Reflection Type Electrooptic Device

Figure 2:
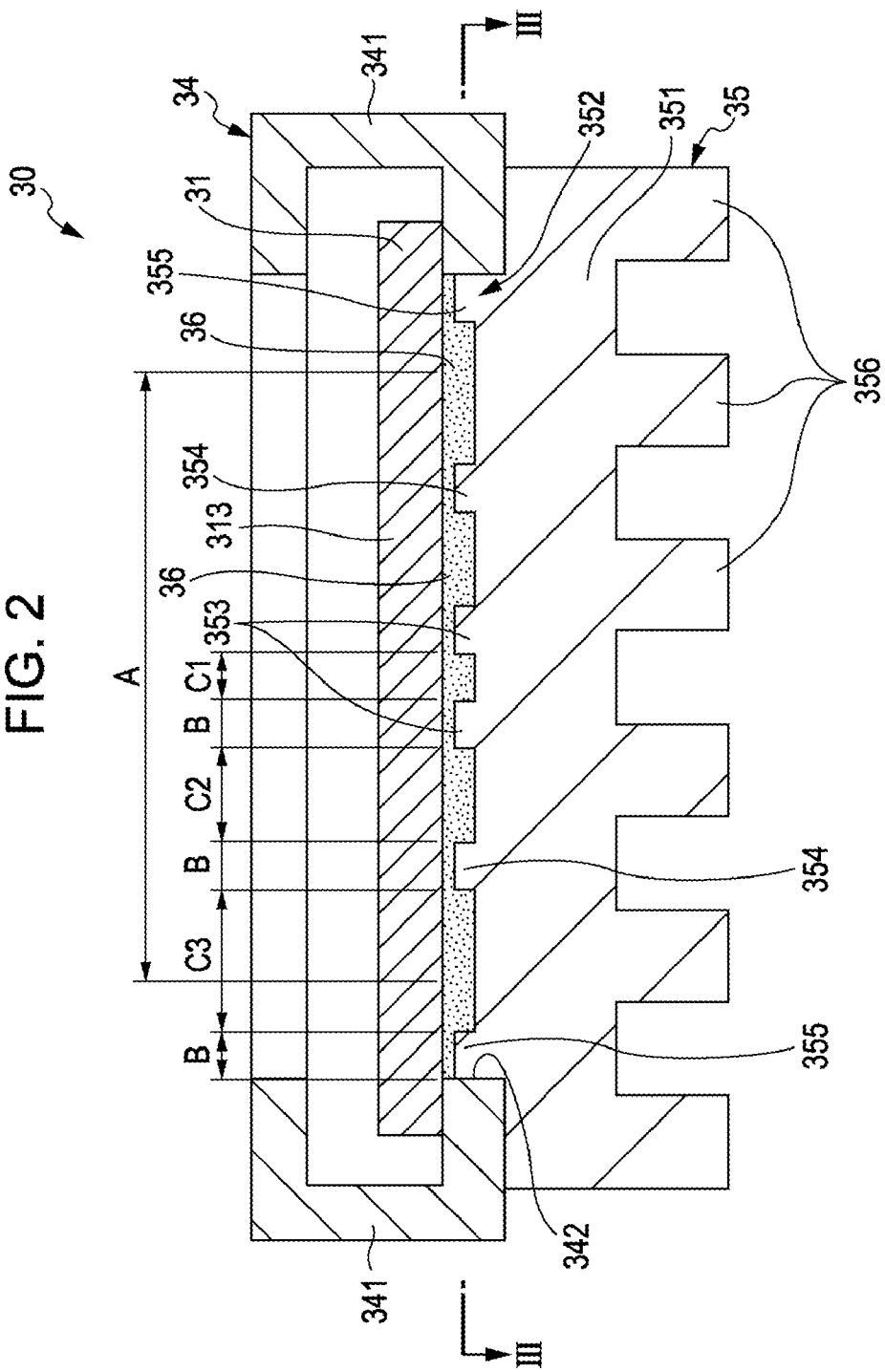
FIG. 2 is a cross-sectional view illustrating a reflection type electrooptic device according to the first embodiment.
Figure 3:
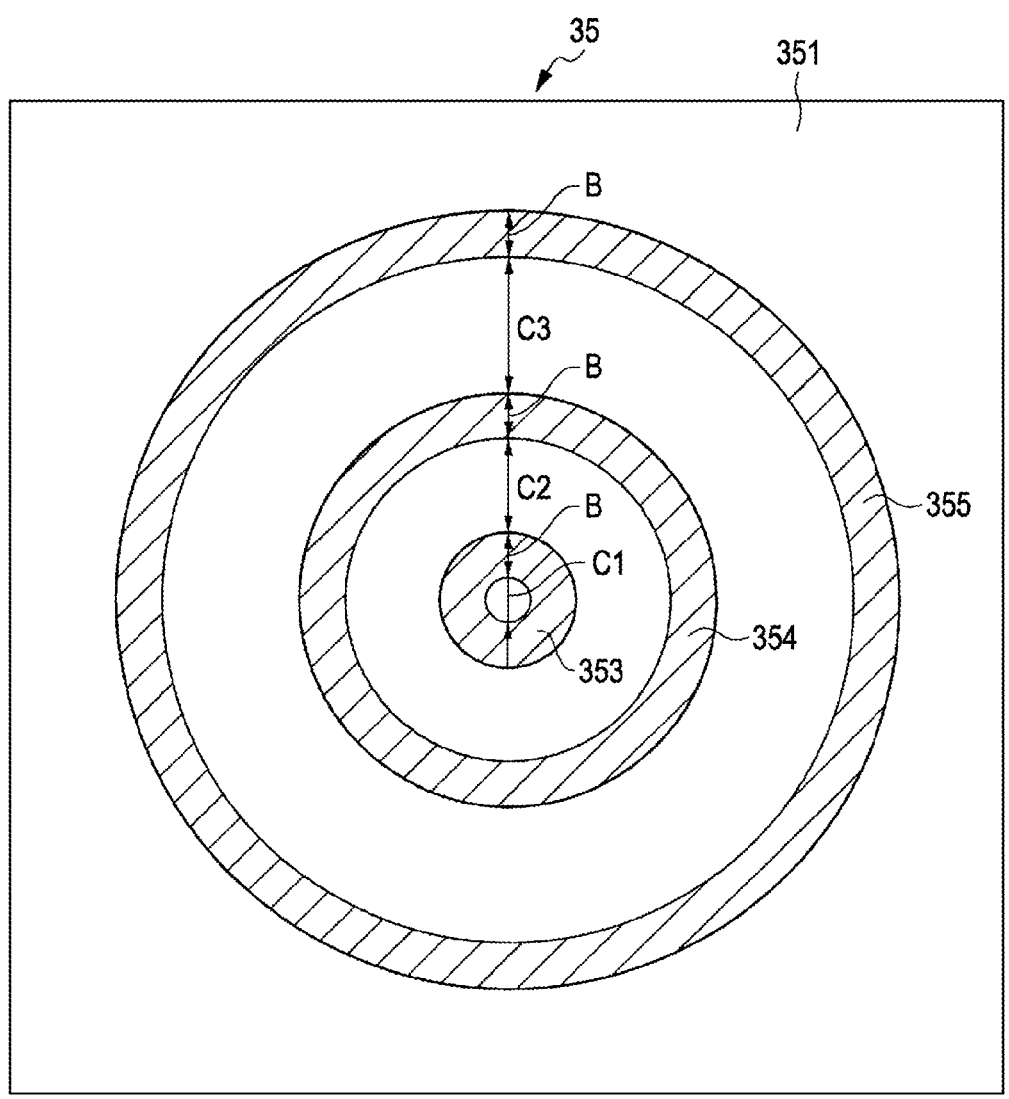
FIG. 3 is a cross-sectional view of FIG. 2 cut along a line III-III.

FIG. 2 is a cross-sectional view illustrating a configuration of the reflection type electrooptic device 30. FIG. 3 is a cross-sectional view of FIG. 2 cut along a line III-III.

The reflection type liquid crystal panel 31 constituting the reflection type electrooptic device 30 includes a reflection substrate, a translucent substrate which is arranged so as to be opposed to the reflection substrate, and liquid crystal which is hermetically sealed between the reflection substrate and the translucent substrate, although they are not shown. The reflection type liquid crystal panel 31 modulates incident light which is incident from the side of a counter substrate (upper direction in FIG. 2) in accordance with image information so as to display an image on a display region 313 having a width A.

Further, the reflection type electrooptic device 30 includes a supporting member 34 which supports the reflection type liquid crystal panel 31, as shown in FIG. 2. The supporting member 34 is made of metal such as aluminum having an excellent heat conductivity, for example. Further, the supporting member 34 includes a frame-shaped supporting main body 341 having an opening 342. The opening 342 has a circular shape and is formed to be a shape smaller than a planar shape of the reflection type liquid crystal panel 31. Further, the supporting member 34 supports the reflection type liquid crystal panel 31 on the periphery of the opening 342 such that the display region 313 is positioned in the opening 342.

Further, as shown in FIG. 2, the reflection type electrooptic device 30 includes the heat dissipating member 35. The heat dissipating member 35 is made of metal such as aluminum having an excellent heat conductivity like the supporting member 34 and is disposed on a surface of the supporting member 34, which is opposite to the surface on which the reflection type liquid crystal panel 31 is arranged. The heat dissipating member 35 includes a plate-shaped heat receiving portion 351 of which planar shape is larger than that of the opening 342. Further, a fitting portion 352 which projects from a center of a heat receiving surface (surface which is arranged so as to be opposed to the supporting member 34) is formed on the heat receiving portion 351. An outer circumferential surface of the fitting portion 352 is formed in a shape capable of fitting into the opening 342 of the supporting member 34.

Further, a plurality of heat dissipating fins 356 as heat dissipating portions are provided on the heat receiving portion 351. The plurality of heat dissipating fins 356 project from a heat dissipating surface at an opposite side to the heat receiving surface and dissipate heat received on the fitting portion 352.

First, second, third heat receiving convexes 353, 354, 355 are provided on the heat receiving surface of the fitting portion 352, which is opposed to the reflection type liquid crystal panel 31. Tip surfaces of the first through third heat receiving convexes 353, 354, 355 have the same height. Dimensions from a basal end of the fitting portion 352 to tips of the first through third heat receiving convexes 353 through 355 are set to be smaller than a depth of the opening 342 of the supporting member 34.

Further, the first through third heat receiving convexes 353 through 355 have the same width B (width of tip surface). The first through third heat receiving convexes 353 through 355 are provided concentrically about a position corresponding to a center portion of a region (heat reception acceleration region) on the fitting portion 352, which corresponds to the display region 313. Further, an inner diameter C1 of the first heat receiving convex 353 is set to be smaller than a space C2 between the first heat receiving convex 353 and the second heat receiving convex 354. In addition, the space C2 is set to be smaller than a space C3 between the second heat receiving convex 354 and the third heat receiving convex 355. That is to say, arrangement pitches of the heat receiving convexes which are adjacent to each other are set to be smaller on the center portion of the heat reception acceleration region (heat reception acceleration center portion) rather than on the ends thereof (heat reception acceleration end portions) when compared with each other by cross sections as illustrated in FIG. 2. With this configuration, ratios of areas of the tip surfaces of the first through third heat receiving convexes 353 through 355 with respect to a unit area of the heat reception acceleration region (tip surface area ratios of the first through third heat receiving convexes 353 through 355) are larger on the heat reception acceleration center portion rather than on the heat reception acceleration end portion.

Further, a space between the reflection type liquid crystal panel 31 and the heat dissipating member 35 is filled with a filler 36 having a good heat conductivity. Heat generated on the reflection type liquid crystal panel 31 is transferred to the heat receiving portion 351 through the filler 36. The filler 36 functions as an adhesive which firmly fixes the heat dissipating member 35 to the supporting member 34 and a back surface of the reflection type liquid crystal panel 31. For example, silicon can be used for the filler 36.

Action Effect of First Embodiment

According to the above first embodiment, the following action effects can be obtained.

The first through third heat receiving convexes 353 through 355 have the same width and are provided concentrically about the heat reception acceleration center portion. Further, the inner diameter C1, the space C2, and the space C3 are set to be larger in this order. Therefore, tip surface area ratios of the first through third heat receiving convexes 353 through 355 are larger on the heat reception acceleration center portion rather than on the heat reception acceleration end portion. Therefore, a heat receiving efficiency on the center portion of which temperature is higher than that of the frame portion on the display region 313 can be made larger than that on the frame portion. Accordingly, temperature distribution on the display region 313 can be made uniform, thereby suppressing deterioration of the liquid crystal due to high temperature. This makes it possible to suppress color unevenness from being caused.

Further, since the first through third heat receiving convexes 353 through 355 are formed in ring shapes, a shape of a mold used for manufacturing the heat dissipating member 35 can be made simple.

Further, since the filler 36 having a good heat conductivity is filled into the space between the reflection type liquid crystal panel 31 and the heat dissipating member 35, a heat receiving efficiency of the heat receiving portion 351 can be enhanced.

Second Embodiment

Next, a second embodiment of the invention is described.

It is to be noted that a reflection type electrooptic device 40 according to the second embodiment is arranged in place of the reflection type electrooptic device 30 in the first embodiment as illustrated in FIG. 1.

Figure 4:
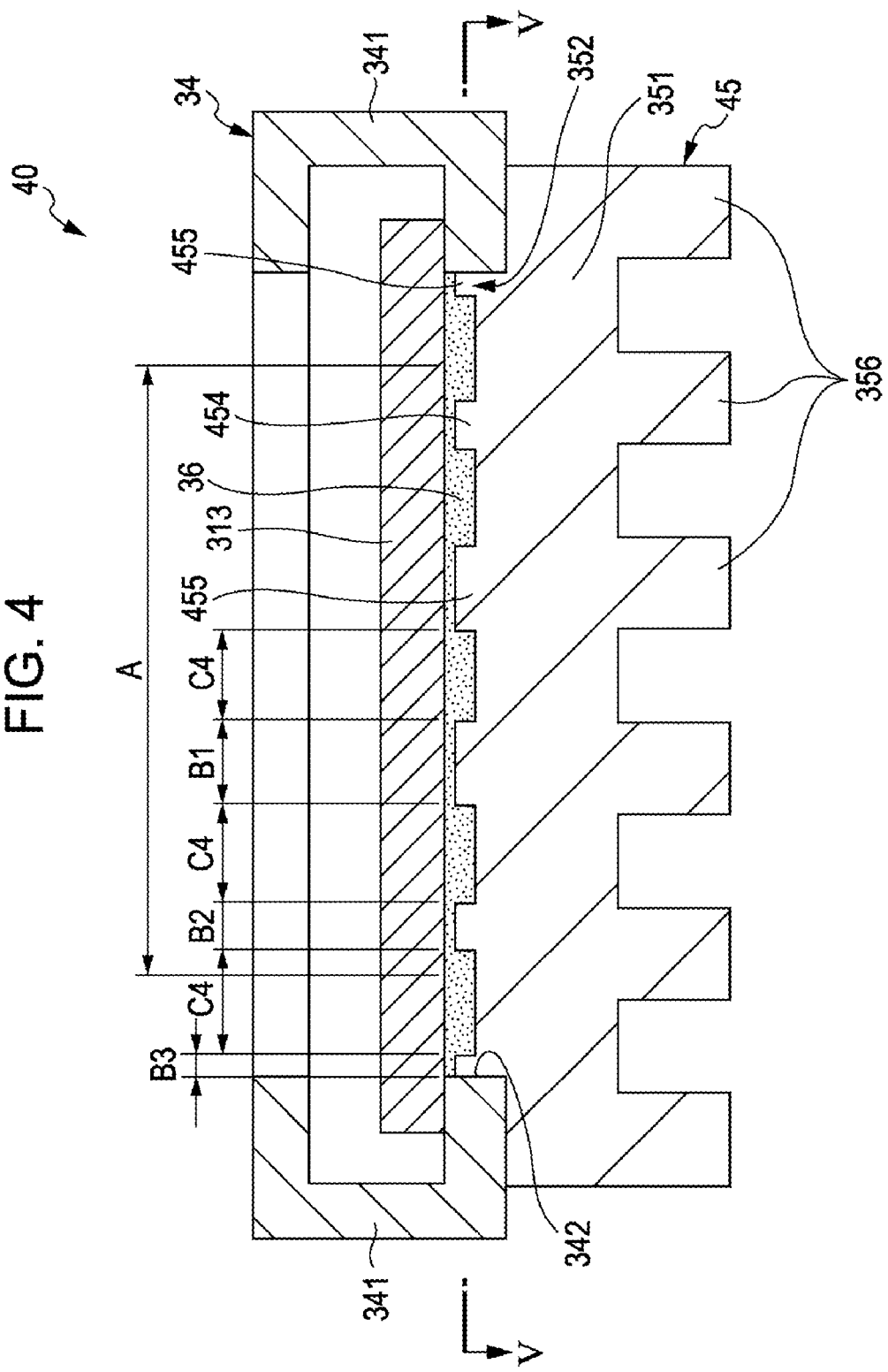
FIG. 4 is a cross-sectional view illustrating a reflection type electrooptic device according to the second embodiment.
Figure 5:
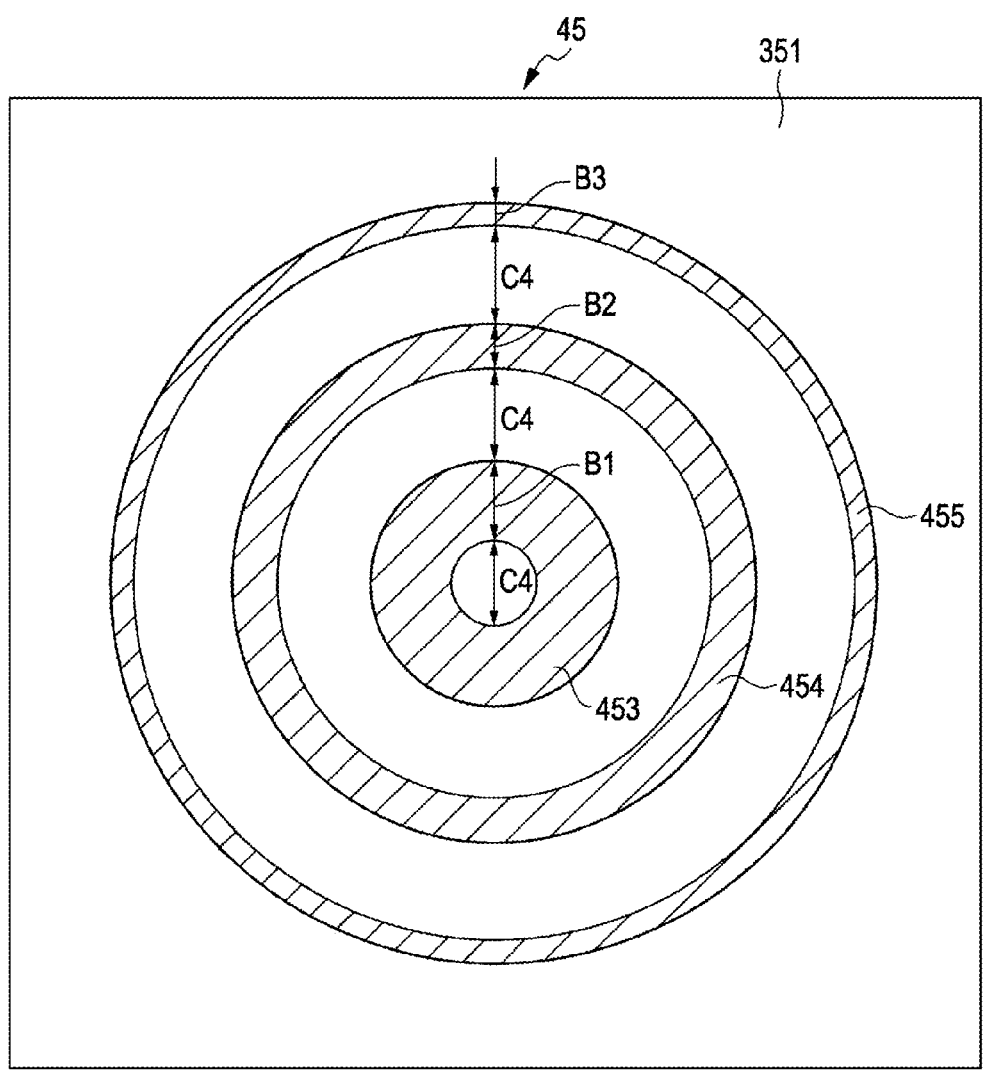
FIG. 5 is a cross-sectional view of FIG. 4 cut along a line V-V.

FIG. 4 is a cross-sectional view illustrating a configuration of the reflection type electrooptic device 40. FIG. 5 is a cross-sectional view of FIG. 4 cut along a line V-V.

It is to be noted that since a basic configuration of the second embodiment is the same as that in the first embodiment, same reference numerals denote common parts and description thereof is not repeated.

As illustrated in FIG. 4 and FIG. 5, a heat dissipating member 45 of the reflection type electrooptic device 40 includes a heat receiving portion 351 having a fitting portion 352.

Further, first, second and third heat receiving convexes 453, 454, 455 formed concentrically are provided on the fitting portion 352. Tip surfaces of the first through third heat receiving convexes 453, 454, 455 have the same height.

Widths B1, B2, B3 of the first, second and third heat receiving convexes 453, 454, 455 are set to be gradually smaller in this order. Further, the inner diameter of the first heat receiving convex 453, the space between the first heat receiving convex 453 and the second heat receiving convex 454, the space between the second heat receiving convex 454 and the third heat receiving convex 455 are set to be a dimension C4. That is to say, tip surface area ratios of the first through third heat receiving convex 453 through 455 become larger on the heat reception acceleration center portion rather than on the heat reception acceleration end portion by changing the areas of the tip surfaces of the first through third heat receiving convex 453 through 455.

Action Effect of Second Embodiment

Figure 6:
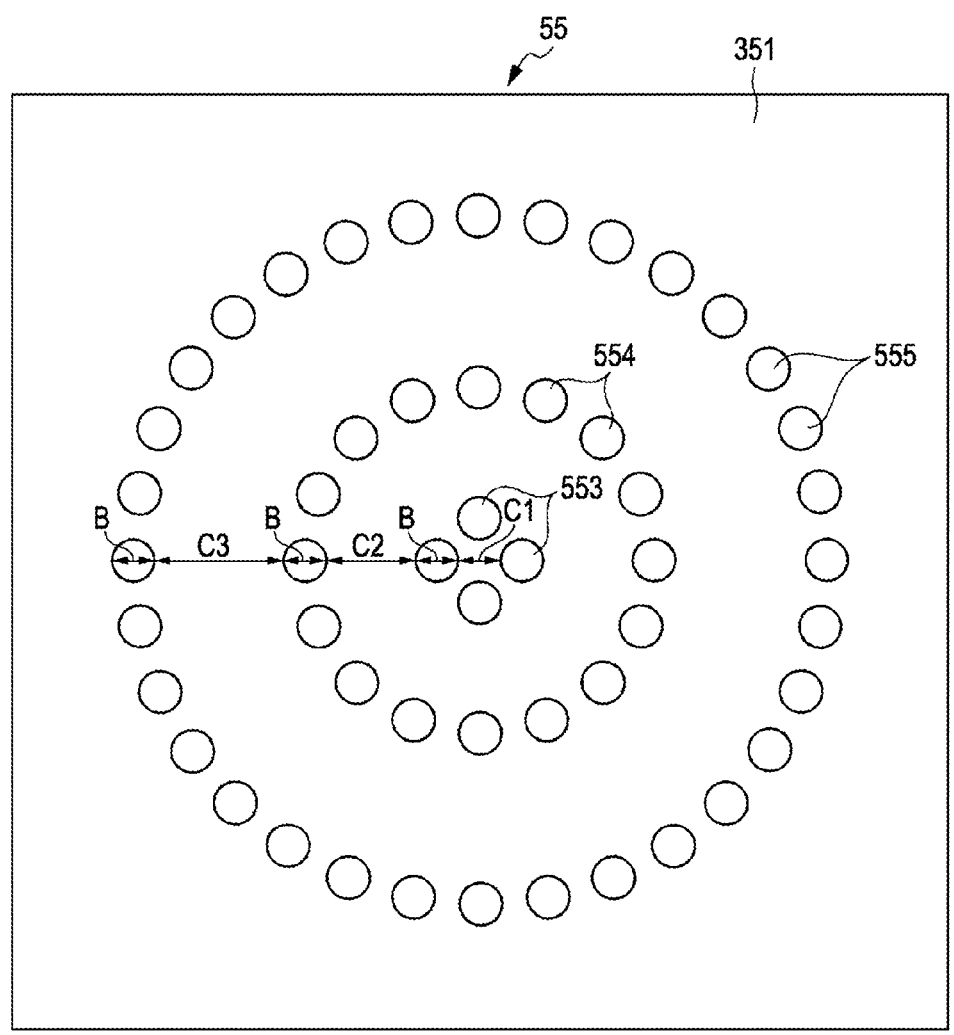
FIG. 6 is a plan view illustrating a heat dissipating member according to a first modification of the invention when seen from a normal line of a heat receiving portion.

The same action effects as those of the above first embodiment can be obtained with the above second embodiment.
Modifications It is to be noted that the invention is not limited to the above embodiments and modifications, improvements, and the like within a range in which an aspect of the invention can be achieved are emcompassed by the inention.
First Modification FIG. 6 is a plan view illustrating a heat dissipating member 55 according to a modification of the first embodiment of the invention when seen from a normal line direction of the heat receiving portion 351. In the modification, first through third heat receiving convexes 553 through 555 as columnar projections are arranged in place of the first through third heat receiving convexes 353 through 355 having ring shapes in the first embodiment. The first through third heat receiving convexes 553 through 555 are arranged so as to be in a discrete manner when seen from the normal line direction of the heat receiving portion 351. Projections provided along a smallest circle correspond to the first heat receiving convexes 553. Projections provided along a second-smallest circle correspond to the second heat receiving convexes 554. Further, projections provided along a largest circle correspond to the third heat receiving convexes 555. The first through third heat receiving convexes 553 through 555 are formed so as to have the same width B (diameter of tip surface). Further, the first through third heat receiving convexes 553 through 555 are formed such that arrangement spaces C1, C2, C3 in the diameter direction of a concentric circle are gradually larger toward the outer side. With such mode, tip surface area ratios of the first through third heat receiving convexes 553 through 555 are larger on the heat reception acceleration center portion rather than on the heat reception acceleration end portion. Therefore, temperature distribution on the reflection type liquid crystal panel 31 on which temperature difference is large can be made uniform.

Figure 7:
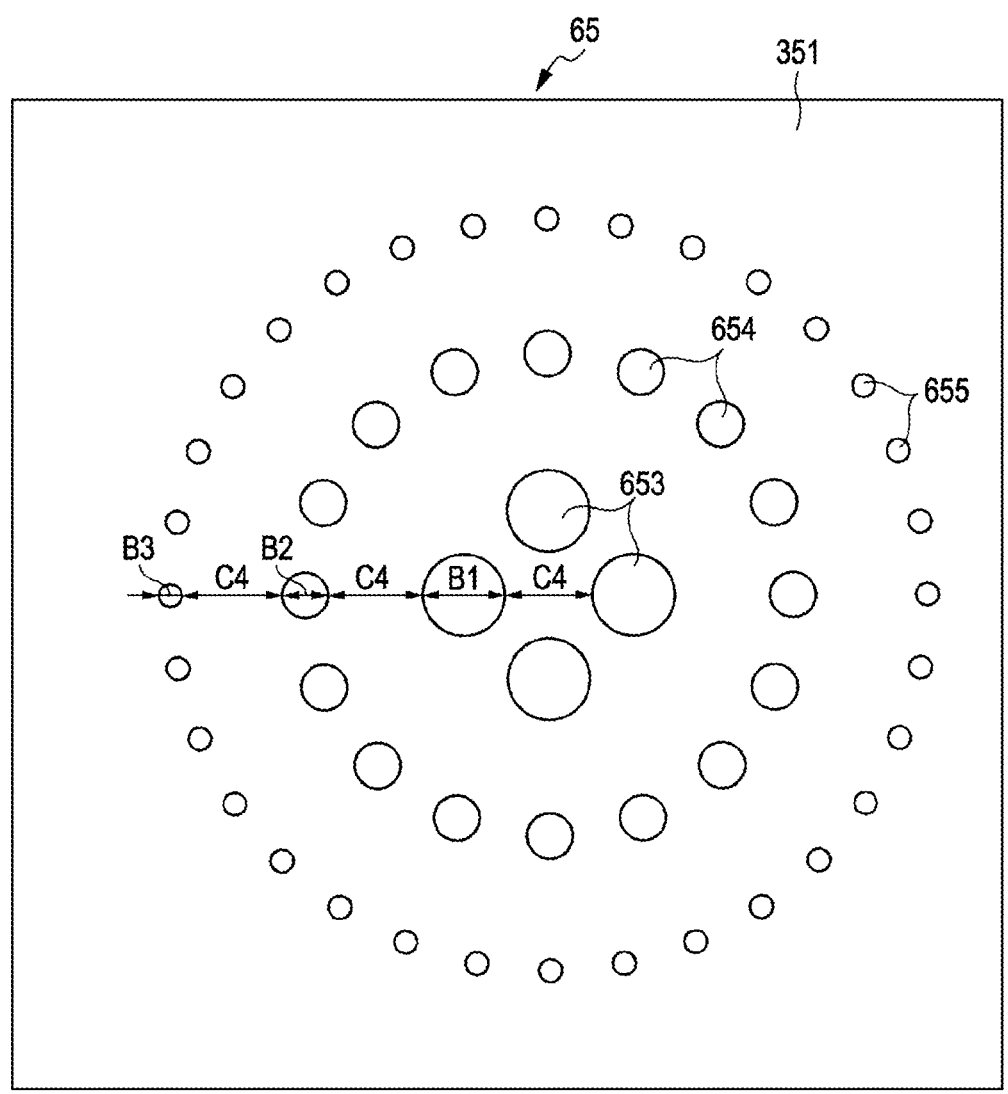
FIG. 7 is a plan view illustrating a heat dissipating member according to a second modification of the invention when seen from the normal line of the heat receiving portion.
Figure 8:
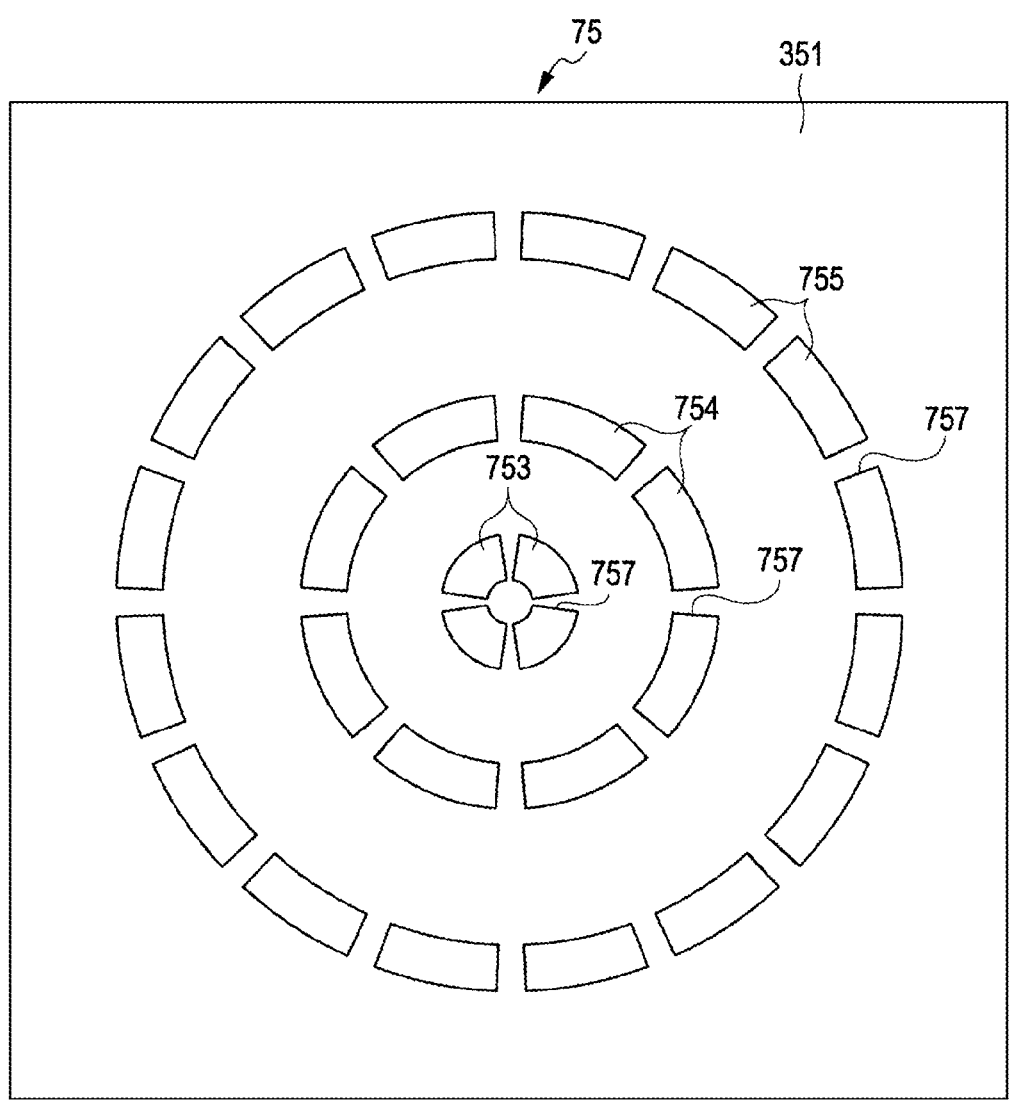
FIG. 8 is a plan view illustrating a heat dissipating member according to a third modification of the invention when seen from the normal line of the heat receiving portion.

Further, with the mode, when the space formed by the reflection type liquid crystal panel 31 and heat receiving tips 553 is filled with the filler 36, the filler spreads evenly. Therefore, the heat dissipating member 35 can be firmly fixed to the reflection type liquid crystal panel 31 easily and uniformly.
Second Modification FIG. 7 is a plan view illustrating a heat dissipating member 65 according to a modification of the second embodiment of the invention when seen from the normal line direction of the heat receiving portion 351. In the modification, as same as the first modification in a circular manner, through third heat receiving convexes 653 through 655 as columnar projections are arranged in place of the first through third heat receiving convexes 453 through 455 having ring shapes as in the first modification. The first through third heat receiving convexes 653 through 655 are also arranged so as to be in a discrete manner. The first through third heat receiving convexes 653 through 655 are formed such that widths B1, B2, B3 (areas of tip surfaces) are smaller in this order and arrangement spaces C4 in the diameter direction of a concentric circle are the same. With such mode, the same action effects as those of the above first modification can be also obtained.
Third Modification FIG. 8 is a plan view illustrating a heat dissipating member 75 according to a modification of the first embodiment of the invention when seen from the normal line direction of the heat receiving portion 351. In the modification, first through third heat receiving convexes 753 through 755 are obtained by providing cutouts 757 on the first through third heat receiving convexes 353 through 355 having ring shapes in the first embodiment from a center of a concentric circle in a radial form. With such mode, the same action effects as those of the above modifications can be also obtained.
Other Modifications Further, the filler 36 may not be provided. In addition, for example, the first through third heat receiving convexes 353 through 355 in the first embodiment may be provided in polygonal shapes or such configuration may be employed in the second embodiment and first through third modifications.

What is claimed is:

1. A heat dissipating member which is arranged so as to be opposed to a reflection type light modulation element comprising:

a heat receiving portion that is opposed to the reflection type light modulation element and has a heat receiving surface for receiving heat from the reflection type light modulation element; and a heat dissipating portion that dissipates heat received on the heat receiving portion to the outside at an opposite surface side to the heat receiving surface, wherein the heat receiving portion has a plurality of convexes which project to the side at which the reflection type modulation element is arranged from the heat receiving surface, and the heat receiving portion is formed such that ratios of areas of tip surfaces of the plurality of convexes with respect to a unit area of the heat receiving surface are larger on a region opposed to a center portion of the heat receiving portion rather than on a region opposed to an end of the heat receiving portion.

2. The heat dissipating member according to claim 1, wherein the plurality of convexes are formed such that arrangement pitches are smaller on the center portion of the heat receiving portion rather than on the end of the heat receiving portion.

3. The heat dissipating member according to claim 1, wherein the plurality of convexes are formed such that the areas of the tip surfaces are larger on the center portion of the heat receiving portion rather than on the end of the heat receiving portion.

4. The heat dissipating member according to claim 1, wherein the plurality of convexes are formed in ring shapes when seen from a normal line direction of the heat receiving surface of the heat receiving portion.

5. The heat dissipating member according to claim 1, wherein the plurality of convexes are formed in columnar shapes and are arranged in a discrete manner when seen from a normal line direction of the heat receiving surface of the heat receiving portion.

6. An electrooptic device comprising:
a reflection type light modulation element on which a pair of substrates are arranged so as to be opposed to each other, and
the heat dissipating member according to claim 1.

7. The electrooptic device according to claim 6, wherein a filler having a good heat conductivity is arranged between the reflection type light modulation element and the heat dissipating member.

8. An electronic apparatus comprising the electrooptic device according to claim 6.

* * * * *